Aug. 6, 1935.   O. SIMMEN   2,010,420
ENGINE CONTROL DEVICE
Filed May 16, 1933   2 Sheets-Sheet 1

INVENTOR:
Oscar Simmen
BY
Pennie, Davis, Marvin & Edmonds
ATTORNEY.

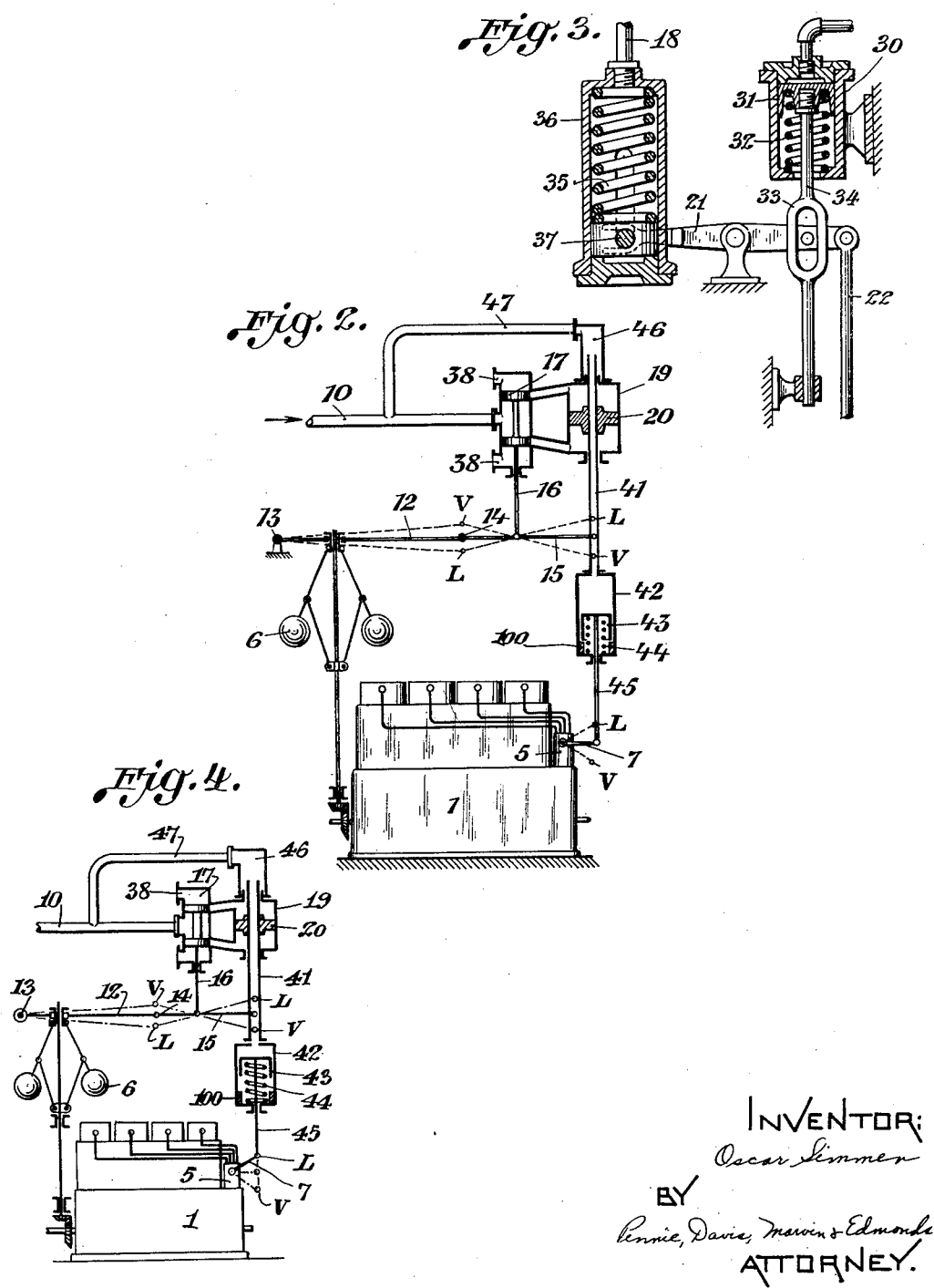

Patented Aug. 6, 1935

2,010,420

UNITED STATES PATENT OFFICE 2,010,420

ENGINE CONTROL DEVICE

Oscar Simmen, Erlach, Switzerland, assignor to the firm of Sulzer Frères Société Anonyme, Winterthur, Switzerland Application May 16, 1933, Serial No. 671,360
In Switzerland July 1, 1932

5 Claims. (Cl. 137—143)

This invention relates to regulating apparatus for prime movers especially internal combustion engines, and of the kind wherein regulating impulses are transmitted by means of suitable transmission medium to a servo-motor which operates a regulating device, such for example as a valve for regulating the supply of fuel or other fluid working medium to the engine. The invention is particularly though not exclusively applicable to internal combustion engines employed on vehicles.

In apparatus of this type as hitherto proposed when the transmission medium, such for example as fluid under pressure, through which the regulating impulses are transmitted to the servo-motor becomes inoperative due, for example, to failure in the supply of medium, the regulating apparatus is rendered inoperative as a whole. Though it has been proposed to overcome this difficulty by providing means whereby, in the event of failure in the supply of transmission medium the servo-motor is actuated to stop the engine, this is open to the disadvantage that the regulating apparatus has to be reset to a normal position before the engine is restarted.

According to the present invention supplementary control apparatus is provided which, in the event of the transmission medium for actuating the regulating apparatus failing or becoming ineffective, automatically adjusts the regulating device of the prime mover and can thus stop the prime mover, this adjustment being effected by the supplementary control apparatus independently of and without actuating the servomotor of the regulating apparatus.

The invention will be understood from a consideration of the following detailed description taken in connection with the accompanying drawings wherein are illustrated, by way of example, two embodiments of the invention.

In these drawings:

Fig. 2 is a similar representation showing a modification of the invention, some of the parts shown in Fig. 1 being omitted;

Fig. 3 represents an enlarged sectional view of certain details; and

Fig. 4 is a view similar to Fig. 2 with the parts shown in a different position corresponding to a different condition of operation.

Figure 1:
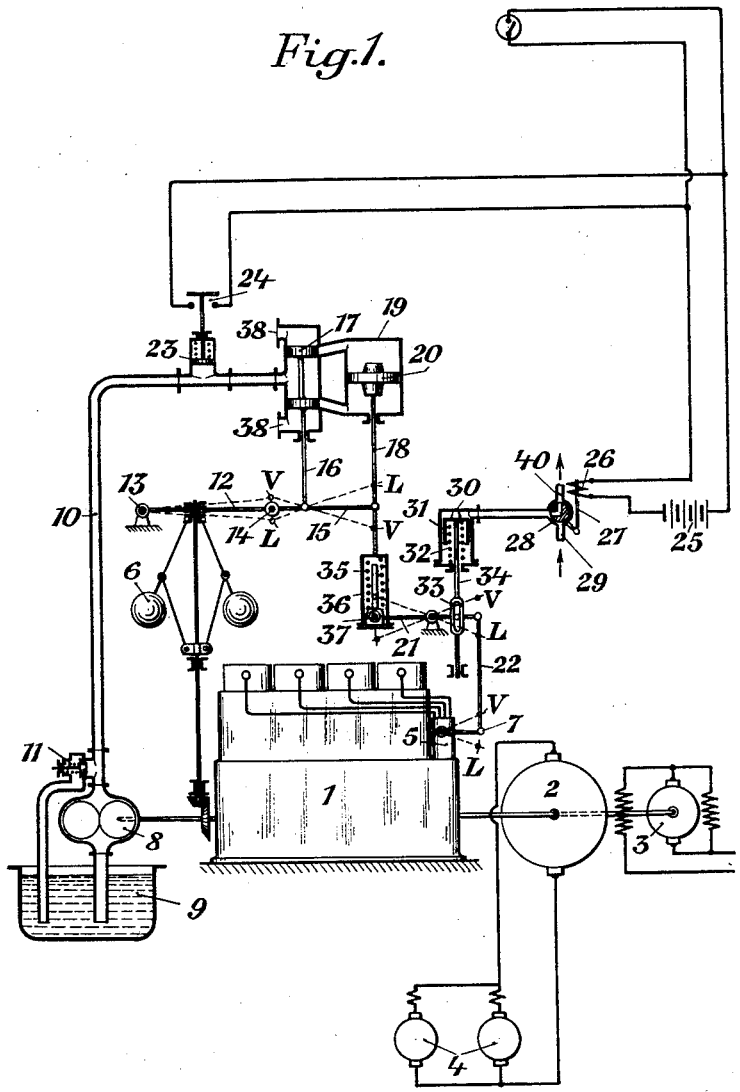
Fig. 1 is a diagrammatic representation of an internal combustion engine driven electric generating unit embodying the invention.

In the construction illustrated in Figure 1 the apparatus comprises an internal combustion engine 1 which drives a main generator 2 and an auxiliary generator 3, the main generator 2 supplying power to tractor motors indicated at 4. A fuel pump 5 delivers fuel to the cylinders of the engine 1 the speed of which is regulated by a governor 6 driven by the engine and operatively connected, as hereinafter described, to a lever 7 for regulating the fuel fed from the pump 5 to the engine. The engine 1 drives a pump 8 whereby pressure medium such, for example, as oil is pumped from a reservoir 9 into a pressure pipe 10, a valve 11 by-passing pressure medium to the reservoir 9 when the pressure in the pipe 10 exceeds a predetermined value. The pressure in the pipe 10 thus tends to remain substantially constant during operation of the engine.

The sleeve of the governor 6 engages a lever 12 pivoted at one end on a fixed pivot pin 13 and pivotally coupled at its other end 14 to a link 15. The link 15 is pivotally connected not only to the operating rod 16 of a piston valve 17 but also to the rod 18 of a servo-motor piston 20, the valve 17 controlling the flow of pressure medium to the servo-motor cylinder 19. The rod 18 is operatively connected through a lever 21 and link 22 to the lever 7 for controlling the fuel delivery of the pump 5.

A spring-controlled plunger 23 subject to the pressure within the pressure pipe 10 controls contacts 24 included in circuit with a battery 25 and relay 26, the armature 27 of which is operatively connected to a rotary valve 28 for controlling the delivery of pressure medium from a supply pipe 29 to a cylinder 30.

The cylinder 30 contains a piston 31 loaded by a spring 32, an elongated slot 33 in the rod 34 of the piston 31 engaging a pin carried by the lever 21. In order that movement may be transmitted from the rod 34 through the lever 21 to the fuel control lever 7 without at the same time moving the servo-motor piston 20, the rod 18 acts on the lever 21 through a spring 35 contained in a cylinder 36 carried by the rod 18, the lever 21 being pivotally connected at 37 to a block which bears against the lower end of the spring 35 which is movable longitudinally within the cylinder 36.

When the engine is in operation and the desired pressure is maintained in the pipe 10, the piston 23 is maintained in the raised position shown so that the supply pipe 29 is closed and the piston 31 therefore in its normal position of rest. The governor then controls the fuel supply and therefore the speed of the engine by means of the valve 17 and servo-motor piston 20.

When the load on the engine is reduced the engine speed will tend to increase, the governor sleeve tending to move downwards. The lever 12 will thus be turned in the clockwise direction about the pivot 13, i. e. towards the position L shown dotted, in which position of the lever 12 and link 15 the engine would be stopped. The control valve 17 is in this way moved downwards from the normal or central position shown to admit pressure medium from the pressure pipe 10 to the cylinder 19 on the lower side of the servo-motor piston 20 and permitting pressure medium to escape from the cylinder 19 above the piston 20 through a discharge pipe 38. The servo-motor piston 20 is thus raised, whereby the lever 21 is turned in the clockwise direction about its pivot so as to turn the valve 7 downwards towards the position L shown dotted, whereby the fuel delivered from the pump 5 is reduced and the engine speed restored to the desired value. In the event of the load on the engine increasing with consequent decrease in the engine speed, the governor sleeve will rise so that the lever 12 and link 15 will move towards the position V which is that corresponding to full load. The valve 17 will thus be raised and medium will be admitted to the upper face of the piston 20 which will move downwards to turn the valve 7 towards the position V, thereby increasing the fuel supply and restoring the engine speed to the desired value.

In the event of the pressure within the pipe 10 failing or dropping below the desired constant value, due for example to the pump 8 being rendered inoperative, the piston 23 will move downwards under the action of its control spring so as to close the contacts 24, thereby energizing the relay 26 and turning the valve 28 so that this connects the supply pipe 29 to the cylinder 30. The piston 31 will now move downwards against the action of its control spring 32 and will turn the lever 7 into the position L, thereby cutting off the fuel supply and stopping the engine. Movement of the piston 31 and its rod 34 in this manner, however, does not result in movement being transmitted to the servo-motor piston 20, since the spring 35 will yield and thus provide lost motion between the lever 21 and the rod 18. The engine is thus automatically stopped without disturbing the setting of the servo-motor and the mechanism associated therewith to effect regulation under normal operating conditions. Restarting of the engine can therefore be effected without resetting or other adjustment of the servo-motor or its associated mechanism. The tension of the spring 35 must be such that while it will not be compressed by the forces transmitted from the servo-motor piston 20, it will yield due to forces transmitted from the piston 31 to the lever 21. When the pressure in the pipe 10 is restored to the normal operative value the contacts 24 will be automatically opened and the valve 28 turned into the position shown in the drawings so that pressure medium can be discharged through a discharge conduit 40 thereby permitting the piston 31 to be restored to its normal position.

In the internal combustion engine represented in Fig. 2, the governor 6 acts, by means of the levers 12 and 15, on the slide rod 16, and consequently, on the member 17. By means of the pipe 10 a pressure agent is supplied to the casing of the piston valve 17 which agent, after operating in the cylinder 19 of the servomotor, passes out again by means of one or the other of the discharge openings 38. The servomotor piston 20 displaces, by means of the piston rod 41 and member 45, the lever 7 of the fuel pump 5.

If the load is heavy, the engine turns over more slowly, and the lever 12 is pushed around the fixed pivot 13 in an upward direction towards the position V. In that case, the lever 15 which is connected at the joint 14 with the lever 12 pushes the piston rod 16 and the slide valve 17 upward. From the pipe 10 a pressure agent now can flow towards the upper side of the servomotor piston 20. At the same time on the lower side, a portion of the pressure agent which is there, is displaced and carried away through the discharge pipe 38. The lever 7 is displaced towards the full load position V, and by this means a greater supply of fuel is furnished to the internal combustion engine.

When the load on the engine falls, the lever 12, the rods and the slide 17 are shifted downwardly, i. e. when the number of revolutions increases so that the piston 20 is forced upwardly and the lever 7 of the fuel pump 5 approaches the idle running position L.

In these regulating processes, the lever 15 acts as a return movement in a manner such that in the beginning of the displacement of the piston 20 and the rods 41 the slide 17 is returned into its average position.

The piston rod 41 is hollow, formed, for example, as a tube, so that the chamber 46 is in connection with the cylinder 42. The pressure agent conducted through the inlet 10 to the slide casing therefore enters the chamber 46 through the branch lead 47 and passes from the latter through the hollow piston rod 41, and into the cylinder 42, thus pressing the piston 43 against the spring 44 as far down as the stop 100. In this position the piston rods 41 and 45 act as an integral, rigid group of rods which adjusts the regulating lever 7 of the fuel pump 5 in proportion to the position of the servomotor piston 20. But if the pressure of the agent which is supplied through the pipe 10 falls under a predetermined amount, the spring 44 pushes the piston 43 upwards as far as the upper stop and then, no matter what position the piston 20 happens to occupy, displaces the regulating lever 7 of the fuel pump 5 into the idle running position so that the engine is put into idle running and/or is stopped and excessive speed is not possible.

It will be understood that the constructions above described are given by way of example only, and that any other suitable means may be employed whereby, in the event of failure of the transmission medium the regulating device will be operated independently of the servomotor. The supplementary control apparatus may act on the regulating device through mechanical, hydraulic, pneumatic or electric means, or by a combination of two or more of these. Further the regulating impulses may be transmitted to the servomotor through any suitable transmission medium such for example as pneumatic, hydraulic, or electric transmission medium. If desired the actuation of the regulating device may be effected by means of stored force derived for example from air pressure, a hydraulic accumulator, electric battery or vacuum tank.

I claim:

1. In a regulating apparatus for prime movers, the combination with the prime mover, of a governor, a regulating device, a servomotor for operating the regulating device and actuatable by a transmission medium, a first transmission means for transmitting the regulating impulses from the governor to the servomotor, a second transmission means for transmitting regulating impulses from the servomotor to the regulating device, and a supplementary control-apparatus connected to said second transmission means and which is controlled by the transmission medium of the servomotor for automatically actuating the regulating device.

2. A regulating apparatus for prime movers as claimed in claim 1, in which there is a yielding double-link, quadruple pivoted connection provided and interposed operationally between the servomotor and the regulating device.

3. A regulating apparatus for prime movers as claimed in claim 1, in which the transmission medium is a fluid medium for transmitting the regulating impulses to the servomotor.

4. In apparatus for regulating prime movers, the combination with a servomotor comprising a piston movable therewithin, a device for regulating the supply of fluid working medium to the engine, said piston being yieldingly coupled to said regulating device, a supplementary control apparatus operatively connected to the said regulating device, means for supplying pressure medium to the servomotor, a governor driven by the engine, a valve for controlling the supply of pressure medium to the servomotor, the yielding coupling between the servomotor piston and the regulating device being independent of the servomotor piston to permit the movement to be transmitted from the supplementary control apparatus to the regulating device, said governor being operationally connected to said valve, and means for, in the event of the supply of pressure medium for the servomotor being rendered ineffective, controlling the regulating device by the supplementary control apparatus to stop the engine.

5. Regulating apparatus as claimed in claim 4, in which the said supplementary control apparatus comprises a cylinder, a piston movable therewithin and operatively connected to the regulating device, and means for controlling the movement of the said piston.

OSCAR SIMMEN.